Sept. 6, 1938.    E. T. MILLER    2,129,228
LOCKING MECHANISM
Filed Oct. 25, 1937    3 Sheets-Sheet 1

Inventor
Edward T. Miller

By Jack A. Schley
Attorney

Sept. 6, 1938. E. T. MILLER 2,129,228
LOCKING MECHANISM
Filed Oct. 25, 1937 3 Sheets-Sheet 2

Inventor
Edward T. Miller
By Jack A. Ashley
Attorney

Patented Sept. 6, 1938

2,129,228

UNITED STATES PATENT OFFICE 2,129,228

LOCKING MECHANISM

Edward T. Miller, Dallas, Tex.

Application October 25, 1937, Serial No. 170,879

13 Claims. (Cl. 70—178)

This invention relates to new and useful improvements in locking mechanism.

One object of the invention is to provide an improved mechanism particularly adapted for use in locking valves, and other devices, against operation by unauthorized persons.

An important object of the invention is to provide an improved mechanism which is applicable to a control valve connected in pipe lines, tanks, or the like, and which is arranged so that it may be utilized to operate said valve; there being means for locking the mechanism against operation whereby unauthorized operation of the valve is prevented.

Another object of the invention is to provide an improved valve locking and operating mechanism which includes a plurality of locking elements which are operated by means of a rotatable member or dial, whereby the operator must know the combination in order to unlock the mechanism; such arrangement eliminating the use of keys or exposed locks and providing a substantially tamper-proof mechanism.

A further object of the invention is to provide an improved mechanism of the character described, which not only provides a locking and operating means but also acts as a shield or protector for the valve, or other device, whereby said valve cannot be damaged or destroyed by vandals; the mechanism being adapted to be used on underground, as well as on surface controlling devices.

A construction designed to carry out the invention will be hereinafter described, together with other features of the invention.

Figure 1:
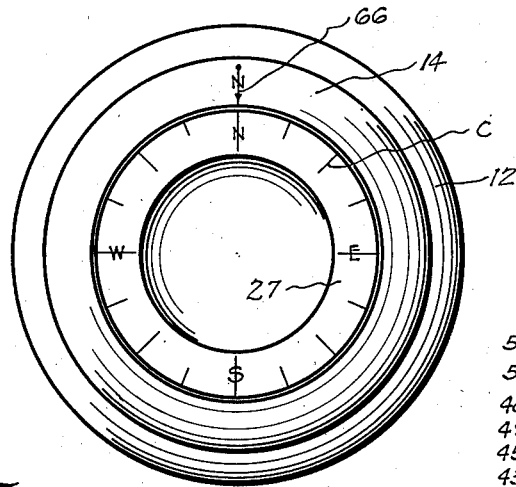
Figure 4:
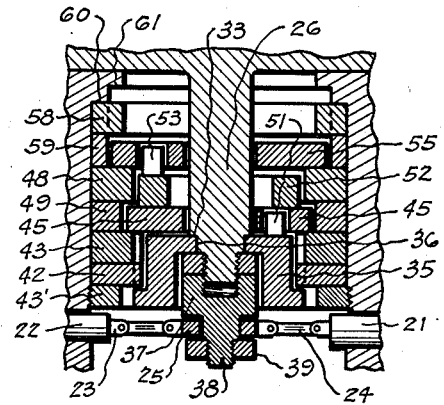
Figure 2:
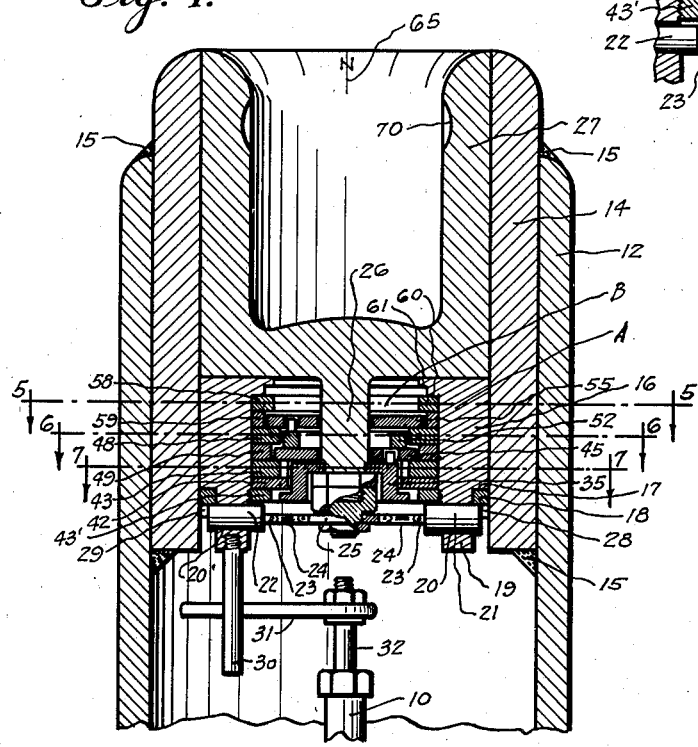
Figure 3:
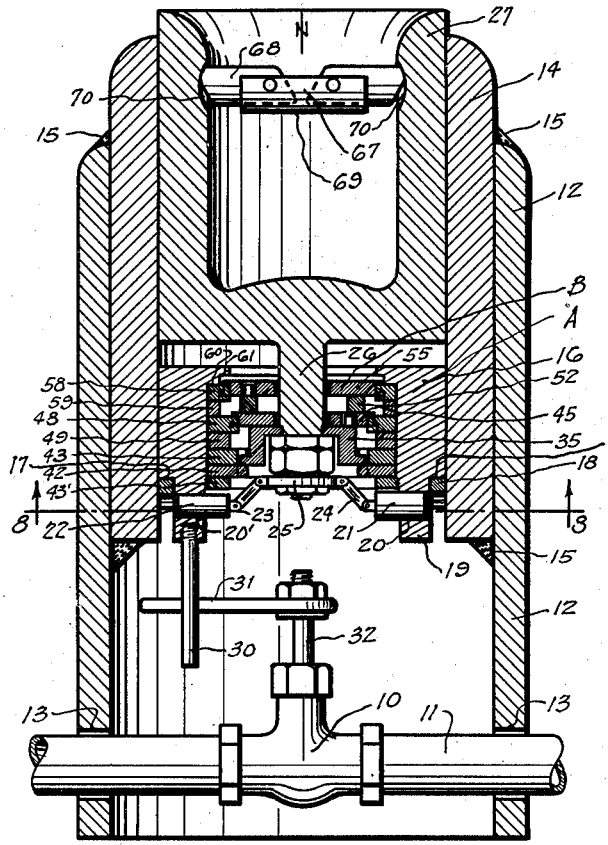
Figure 9:
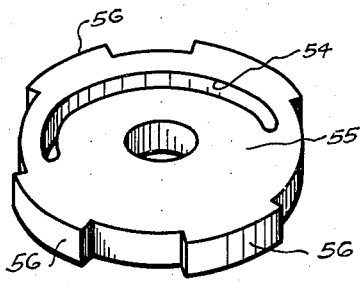
Figure 10:
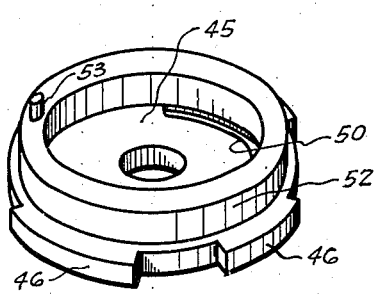
Figure 11:
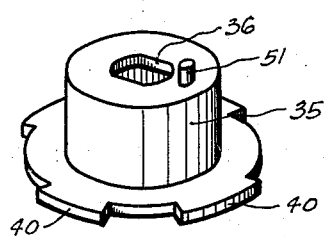
Figure 8:
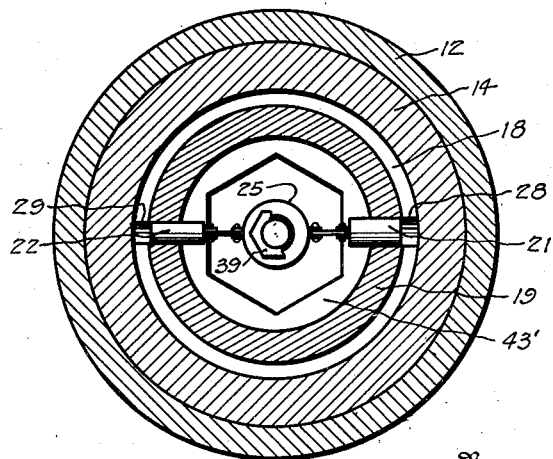
Figure 5:
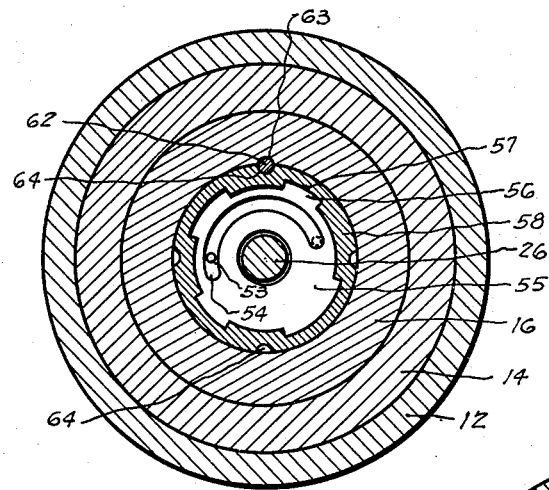
Figure 6:
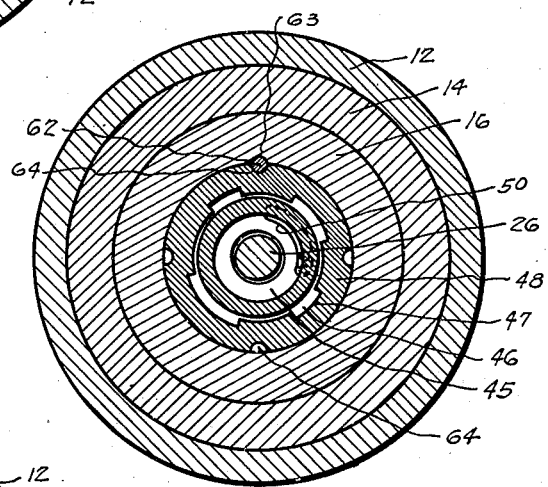
Figure 7:
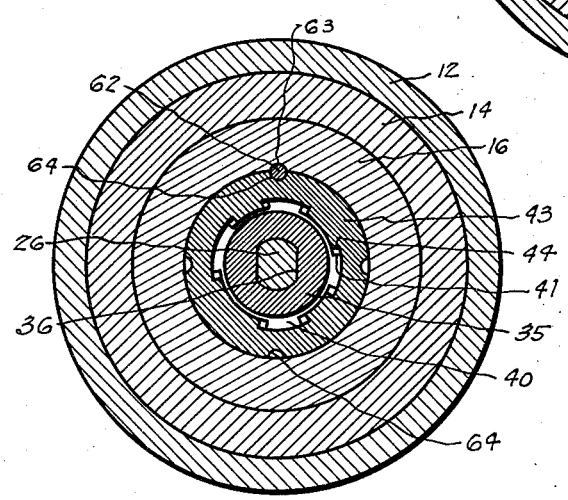

The invention will be more readily understood from a reading of the following specification and by reference to the accompanying drawings, in which an example of the invention is shown, and wherein:

Figure 1 is a plan view of a locking and operating mechanism, constructed in accordance with the invention, Figure 2 is a transverse, vertical, sectional view, showing the mechanism in a locked position, Figure 3 is a view similar to Figure 2 with the mechanism in an unlocked position, Figure 4 is an enlarged transverse, vertical, sectional view of the locking element as shown in Figure 2, Figure 5 is a horizontal, cross-sectional view, taken on the line 5—5 of Figure 2, Figure 6 is a horizontal, cross-sectional view, taken on the line 6—6 of Figure 2, Figure 7 is a horizontal, cross-sectional view, taken on the line 7—7 of Figure 2, Figure 8 is a horizontal, cross-sectional view, taken on the line 8—8 of Figure 3, Figure 9 is an isometric view of the uppermost locking plate or element, Figure 10 is an isometric view of the central locking plate or element, and Figure 11 is an isometric view of the lowermost locking element.

In the drawings, the numeral 10 designates an ordinary control valve which is connected in a flow line 11. The line may be disposed on the surface of the ground or may be buried therebeneath. A cylindrical casing or shell 12 surrounds the valve 10, as is clearly shown in Figures 2 and 3, and is provided with openings 13 near its lower end, whereby the line 11 may extend therethrough. The height of the shell 12 is subject to variation and if the valve 10 is buried, as it would be if applied to an underground pipe line, the shell is of sufficient length to extend upwardly above the surface of the ground. If the valve 10 is connected in a surface line, the lower end of the shell 12 would be buried in the ground so as to prevent its displacement. As is clearly shown in Figures 2 and 3, the shell is of the same diameter throughout its length and is open at both ends. It is pointed out that the invention will be described as applied to a control valve, but it is particularly noted that said invention may be applied to other devices and is not to be limited to operating a valve.

An elongate sleeve 14 is inserted within the upper portion of the shell 12 and has its upper end projecting therefrom. The sleeve is fastened to the shell by welding 15, or other means, whereby the shell and sleeve are permanently secured to each other. The sleeve 14 houses the locking mechanism and need only be sufficiently long to accommodate the same. For manufacturing purposes, it is preferable that the sleeve 14 be separate from the shell and fastened thereto as shown; however, it would be possible to make these two elements integral with each other.

A locking assembly A is mounted in the lower end of the sleeve 14 and includes a collar 16 which has a snug fit within the sleeve. An external annular recess is formed at the lower end of the collar 16, whereby an external annular shoulder 17 is provided. This shoulder on the collar 16 is adapted to engage and rest upon a ring 18 which is welded, or otherwise secured within the lower end of the sleeve 14. With such arrangement, it will be manifest that the collar 16 of the locking assembly A rests upon and is supported by the ring 18, which in turn, is carried by the sleeve 14. It is pointed out that the collar 16 is rotatable on the ring.

A pair of diametrically opposed guide lugs 19 are preferably made integral with the collar 16 and depend therefrom. It is desirable that the lower end of each lug 19 terminates in substantially the same plane as the sleeve 14, although this is not essential. One of the lugs 19 is formed with an opening 20 while the other lug is formed with a similar opening 20' and, as is clearly shown in Figure 8, these openings extend radially. The opening 20 has a larger diameter than the opening 20' and is adapted to receive a cylindrical plunger 21. The opening 20', which is the smaller of the two, is arranged to have a similar plunger 22 slidable therethrough. The inner end of each plunger is formed with ears 23 whereby one end of a connecting link 24 may be pivoted thereto. The other ends of the links 24 are pivotally connected to a collar or ring 25 which is secured to the lower end of a stem or shank 26, as will be explained. The shank 26 is preferably made integral with and depends axially from an operating head 27, which is rotatable within the upper end of the sleeve 14 above the locking assembly A. Due to the linkage arrangement between the stem or shank and the plungers 21 and 22, it will be obvious that as said shank is raised and lowered, the plungers will be retracted and expanded in a radial direction within their respective openings 20 and 20'. When the plungers 21 and 22 are in an expanded position, the head 27 has been lowered to engage the upper end of the collar 16, as is clearly shown in Figure 2. In such position, the outer ends of the plungers project from the openings 20 and 20' in the lugs 19 and engage in notches 28 and 29, respectively, which notches are formed in the underside of the supporting ring 18 (Figure 8). The notch 28 is diametrically opposite the notch 29 and is adapted to receive the larger plunger 21, while the smaller notch 29 receives the smaller plunger 22. By making the notches and plungers of different sizes, the head 27 can be lowered and locked in only one position with relation to the sleeve 14.

When the plungers 21 and 22 are engaging their respective notches, it is obvious that the collar 16 is locked in an immovable position within the sleeve 14 and it is not possible to rotate the same. When the plungers are retracted, as shown in Figure 3, the collar 16 is capable of rotation within the sleeve. One of the lugs 19 of the collar 16 is provided with a depending actuating rod 30 which extends downwardly within the shell or casing 12. The lower portion of this rod is adapted to engage the outer end of a radial operating bar 31, which bar has its inner end fastened to the operating stem 32 of the valve 10. With such arrangement, it will be obvious that when the collar 16 is rotated, the bar 31 is engaged by the depending rod 30 and movement is thus imparted to the bar. When the bar 31 is moved, the stem 32 is rotated, whereby the valve 10 is regulated. Therefore, the collar 16, when rotated, regulates the valve 10.

For imparting a rotation to the collar 16, a plurality of locking elements B are located within the collar and surround the depending shank 26 of the operating head 27. When the head is in its lowermost position, as shown in Figure 2, the plungers 21 and 22 are engaging their respective notches 28 and 29 in the supporting ring 18, whereby the collar 16 is locked against rotation. At this time, the locking elements within the collar 16 are so positioned that there is no connection between the head 27 and shank 26 and said collar. These elements will be hereinafter described in detail. Suffice it to say, that when the plungers are engaging their notches, there is no connection between the head and shank and the collar 16. Therefore, if the head 27 is rotated, the collar 16 is not rotated therewith. When the head 27 is raised upwardly to the position shown in Figure 3, the plungers 21 and 22 are moved to a retracted position to disengage their notches 28 and 29. This upward movement not only retracts the plungers but also moves the locking elements B into such position that the shank 26 is connected with the collar 16. Therefore, after the head 27 is raised to the position shown in Figure 3, a rotation of the head will rotate the collar 16, whereby the rod 30 acting on the bar 31 will rotate the stem 32 of the valve 10 to regulate the same. It is noted that when the head 27 is raised to connect the shank 26 with the collar 16, the plungers 21 and 22 are retracted so as to permit a rotation of the collar when the head 27 is rotated.

The locking elements B which are adapted to connect the shank 26 with the collar 16 are clearly shown in Figure 4. The shank 26 depends axially through the collar and is formed with an external shoulder 33 which is located near its lower end. A flanged collar 35, which forms the lowermost locking element, is provided with an axial opening 36 in its top and the lower end of the shank 26 extends therethrough. The upper end or top of the collar 35 abuts the shoulder 33 and is held thereon by lock nuts 37 which are threaded onto the lower end of the shank. The lowermost nut is provided with a depending screw-threaded pin 38 over which the retaining ring 25, which is connected to the links 24 of the plungers 21 and 22, is engaged. The ring 25 is confined on the pin 38 by suitable retaining nuts 39. It is noted that with this arrangement, the collar 25 is not connected to the pin 38, whereby the shank 26 and said pin may rotate with relation to the collar. Therefore, the head 27 and shank 26 may undergo rotation without imparting any movement to the plungers 21 and 22.

The flanged collar 35 which forms the lowermost locking element is confined on the shank 26 between the shoulder 33 and the lock nuts 37 and is therefore rotatable with the shank. The lower end of the collar 35 is bent outwardly to form a plurality of radially directed lugs 40. These lugs, as is clearly shown in Figure 11, are spaced around the collar and are adapted to engage in recesses 41 which are provided in the inner surface of a ring 42 (Figure 7). The ring 42 rests upon and is supported by a ring 43' which is threaded into the lower end of the bore of the collar 16. When the head 27 and shank 26 are in a lowered position, with the plungers 21 and 22 engaging their respective notches 28 and 29, the lugs 40 on the member 35 are in a plane below the ring 42, whereby said lugs are not engaging the recesses 41. Resting on the ring 42 is a second ring 43 which is slightly higher or greater in thickness than the ring 42. This ring is provided with a plurality of recesses 44 which are alined with the recesses 41 in the ring 42. However, as is clearly shown in Figure 7, the recesses 44 are slightly larger or longer than the recesses 41. The lugs 40 on the flanged collar 35 are complementary to and of substantially the same size as the recesses 41 in the lowermost ring 42, whereby when the shank 26 is raised, the lugs 40 may pass upwardly through the notches or recesses 41 and into the recesses 44 of the upper ring 43. When this is done, a slight rotation of the shank 26 in either direction will cause the underside of the lugs 40 to engage the upper surface of the ring 42 adjacent the notches or recesses 41. When this is done a downward movement of the shank and collar 35 cannot be accomplished until the lugs 40 are again perfectly alined with the notches or recesses 41 in the lower plate 42. In this manner, a means is provided whereby when the shank 26 and head 27 are raised to the positions shown in Figure 3, said shank and head may be held in such position by the engagement of the lugs 40 on the upper surface of the ring 42.

A second or intermediate locking element is provided in the form of a plate 45 which surrounds the shank 26 above the flanged collar or lowermost locking element 35. This plate is of a diameter so that its outer periphery rests upon the inner edge portion of the ring 43 and the plate is normally supported in this position. Its outer periphery is notched to form a plurality of arcuate lugs 46, which lugs are adapted to engage in arcuate recesses 47 which are formed in a ring 48. The ring 48 is supported within the collar 16 on a spacer 49 which spacer rests on the ring 43. It will be obvious that by observing Figure 4 the transverse width of the spacer is such that the inner portion of the rings 48 and 43 extend inwardly beyond said spacer. The arcuate recesses or notches 47 in the ring 48 are misalined in a vertical plane with the notches 44 and the notches 41 of the rings 43 and 42 respectively. Therefore, the collar or lower element 35 must be in one radial position to aline its lugs 40 with the notches 41 and 44 of the rings 42 and 43 respectively, while the plate 45 must be in another radial position to aline its lugs 46 with the notches or recesses 47 of the plate 48.

The plate 45 is not directly connected to the shank 26 since such shank can rotate therethrough and for connecting said plate to said shank so that the plate is rotated when the shank is rotated, said plate is formed with an arcuate slot 50. A pin 51 extends upwardly from the top of the flanged collar or element 35 and engages in the slot 50, and with such arrangement, it will be obvious that a rotation of the collar 35 will impart a rotation to the plate 45 when the pin 51 strikes one end of the slot 50. However, if the pin is moving through the slot, there is no movement imparted to the plate 45 and therefore the length of the slot controls the amount of movement which the collar 35 may undergo without imparting a similar movement to the plate 45.

An upstanding annular flange 52 is secured to the plate 45 and this flange has an upwardly extending pin 53 provided thereon. Since the flange is secured to the plate 45, it will be evident that a rotation of the plate will impart a similar rotation to the flange, as well as to the pin 53 carried by said flange. The pin 53 engages within an arcuate slot 54 which is provided in a plate 55, which plate forms the uppermost locking element. The plate 55 normally rests on the upper surface of the ring 48 and is provided with cut out portions or notches in its periphery whereby a plurality of arcuate lugs 56 are formed thereon. These lugs 56 are adapted to register with and engage arcuate notches or recesses 57 which are formed in an uppermost ring 58. The ring 58 is spaced from the ring 48 by a spacer 59. The top of the uppermost ring 58 engages an internal shoulder 60 formed within the collar 16 and above the shoulder a second internal shoulder 61 which overhangs the lugs 56 of the uppermost plate 55, is provided.

It is pointed out that the notches or recesses 57 in the plate 58 are misalined with and preferably of a different size than the notches in either of the plates 48, 43 and 42. This causes the lugs of the plates 45 and 55 and the lugs 40 of the collar 35 to be of different sizes and at different radial positions, whereby no two are alike. Therefore, each locking element can be alined with only its respective ring. If any one of the three locking elements are misalined with their respective notches, then it is not possible to raise the shank 26 and operating head 27. It is only when the plate 55 is alined with its ring 58, the plate 45 alined with its ring 48 and the collar 35 properly alined with its rings 42 and 43, that it is possible to raise the head 27 to retract the plungers 21 and 22 from their respective notches 28 and 29. Therefore, when the head is in its lowered position, as shown in Figure 2, and the lugs of any one of the locking elements misalined with its respective notches, the mechanism is in a locked position and it is impossible to operate the valve 10. When all of the locking elements 35, 45 and 55 have their lugs alined with their respective notches in the locking rings, it is possible to raise the head 27 and shank 26 to the position shown in Figure 3. This movement of the head and shank retracts the plungers 21 and 22 from their notches 28 and 29 whereby the collar 16 may be rotated. The upward movement of the head and shank causes the engagement of the lugs of the locking elements with their respective notches and when the head is rotated, a rotation is imparted to the collar 16 by means of the engagement of the elements with their notches. The various rings 42, 43, 49, 48, 59 and 58, are confined within the collar 16 between the shoulder 60 and the retaining ring 43' and are immovably clamped therein. However, to assure that the rings will remain in their respective radial positions, a vertical pin 62 extends downwardly through complementary grooves 63 and 64, as is clearly shown in Figure 7. The groove 63 is formed in the collar 16, while the groove 64 is provided in the outer surface of the various rings. Manifestly, the vertical pin 62 engaging these complementary grooves will prevent rotation of the rings within the collar 16. If desired, each ring may be provided with a plurality of grooves 64 (Figure 7) whereby it may be moved to various radial positions within the bore of the collar 16 in order to change the relative positions of the rings and thereby change the combination of the lock.

The upper periphery of the operating head 27 is formed with a plurality of indications 65 whereby a dial is formed therearound. A suitable pointer or indicator 66 is formed on the periphery of the sleeve 14 and the dial and pointer serve to guide the operator when said operator is rotating the head to aline the various locking elements with their respective notches. In order to facilitate the rotation of the head 27, a suitable handle 67 is provided. This handle comprises a pair of pins 68 which have their inner ends pivoted to a central member 69. The outer ends of the pins are adapted to engage in diametrically opposite recesses 70 formed in the upper end of the bore of the head 27, as is clearly shown in Figure 3. This handle is removable and is placed in engagement with the notches only when it is desired to operate the device.

In operation, assuming the mechanism to be in a locked position, as shown in Figures 2 and 4, the head 27 is first rotated several complete turns in a clockwise direction so that the pin 51 on the collar 35 engages one end of the slot 50 and also so that the pin 53 engages one end of the slot 54 in the uppermost plate 55. It is noted at this time that the slot 54 in the plate 55 is longer than the slot 50 in the plate 45. When the head has been rotated so that the pins 51 and 53 are engaging the ends of their respective slots, it will be evident that a rotation in a clockwise direction (Figure 1) will cause a rotation of all three locking elements. When this is done, the indicator on the top of the head 27 is moved to a starting position, which for the purposes of this description will be assumed as North being opposite the pointer 66.

The combination of the mechanism, or the movement of the head which is necessary to aline the plates or locking elements, is of course controlled by the position of the recesses on the locking rings and is, therefore, subject to variation. It will be assumed, however, that a quarter turn in a clockwise direction (Figure 1) of the head will aline the uppermost plate 55 so that its lugs 56 are alined with the notches 57 in the plate 58. Thus after the mechanism is set as has been described, the head 27 is rotated until the indication West is opposite the indicator 66. A quarter turn rotation has been imparted to the lowermost element 35 which has also imparted a quarter turn to the intermediate plate 45 through the medium of the pin 51 and slot 50. The plate 45 has imparted a quarter turn to the uppermost plate 55 by means of the pin 53 engaging in the slot 54 of said uppermost plate. This quarter turn has alined the lugs 56 of the uppermost plate with the recesses or notches 57 of the ring 58. Thus the first quarter movement in a clockwise direction alines the top plate 55 so that its lugs 56 are alined with the notches or recesses of its locking ring 58.

It is now necessary to aline the intermediate plate 45 so that its lugs move into alinement with the notches 47 of its locking ring 48 and it will be assumed that a 180 degree movement of the head 27 is necessary to bring about this alinement. The head is rotated so that the indication West on the dial is moved out of alinement with the indicator 66 and the indication East is alined therewith. This is accomplished by a 180 degree rotation in a counter-clockwise direction. During this counter-clockwise movement of the head 27, the flanged collar 35 which forms the lowermost locking element is rotated 180 degrees in a counter-clockwise direction. During the initial portion of this 180 degree movement of the collar 35, the plate 45 is not moved since the pin 51 is moving from one end of the slot 50 to the opposite end thereof. This slot is shown as approximately 90 degrees and therefore during the first half of the movement of the collar 35, the plate 45 does not move. It is during the second half of the movement of the collar 35 that the plate 45 is rotated and it is this rotation of the plate 45 that alines its lugs 46 with the notches 47 in its locking ring 48. Since the slot 54 in the uppermost plate 55 which has already been alined, is much longer than the slot 50 in the plate 45, it will be obvious that the plate 45 completes its movement before the pin 53 travels from one end of the slot 54 to the other. Therefore, while the second plate 45 is being alined, the uppermost plate 55, which has been previously alined, is inactive or stationary.

After the plates 55 and 45 have been adjusted or alined, it is necessary to aline the collar 35 so that its lugs 40 are alined with the recesses 41 in the ring 42 and the recesses 44 in the ring 43. To accomplish this, the head 27 must again be rotated in a clockwise direction. For the purposes of this description, it will be assumed that one-eighth of a turn in a clockwise rotation will aline the lugs 40 of the lowermost locking element. This means that after the plates 55 and 45 have been alined as explained, the head 27 must be again rotated in a clockwise direction (Figure 1) one-eighth of a turn or revolution. This would mean that the dial must be turned from the point East to the point designated C on the dial. This one-eighth of a revolution or 45 degrees, causes a rotation of the collar 35 without imparting rotation to the plate 45 which has already been alined. This is true because the pin 51 which connects the collar with the plate is again moving from one end of the slot 50 to the opposite end thereof. It never reaches this opposite end to impart a rotation to the plate 45 because the alinement of the lugs 40 is completed before the pin 51 strikes the end of the slot 50.

Thus it will be seen that the three locking elements, 35, 45 and 55 have their lugs alined with the notches of their respective locking rings. When so alined, it is possible to raise the head 27 and shank 26 which causes said lugs to pass into and through the notches or recesses. The upward movement of the shank 26 will retract the plungers 21 and 22 from their respective notches 28 and 29 and unlock the collar 16. The shank and head are raised until the uppermost plate 55 strikes the shoulder 61 within the collar 16 and when this occurs a slight rotation of the head and shank will cause the collar 35 to be rotated with relation to the locking ring 43 whereby its lugs may engage the upper surface of said locking ring adjacent the notches or recesses 41, as has been explained. The engagement of the lugs 40 on the upper surface of the ring 42 holds the parts in their raised positions and the engagement of the lugs 40 of the lowermost element with their respective notches in the locking ring 43 connects the shank 26 with the collar 16, whereby continued rotation of the head 27 will impart a rotation to the collar 16 and thereby regulate the valve 10 by means of the rod 30 and the bar 31. It is noted that the spacing between each element 35, 45 and 55 and its respective ring, is such that when the shank 26 is raised, the lugs of all the elements engage the notches of their respective rings simultaneously.

After the valve is properly regulated, the head is slightly rotated to again aline the lugs 40 exactly with the recesses 41 of the ring 42. When this is done, the entire assembly may be again lowered to the position shown in Figure 2 whereby the plungers 21 and 22 return to their locked position in engagement with the notches 28 and 29 of the supporting ring 18. The head 27 may then be rotated to again misaline the plates with their respective locking rings and unless the person knows the combination, it is practically impossible for him to unlock the mechanism.

It is pointed out that the shell 12 extends some distance above the valve 10 and not only provides a housing to completely enclose the mechanism, but also forms a shield or protector for the valve whereby damage to the valve is prevented. With the arrangement shown, it is impossible for an unauthorized person to actuate the valve 10 and neither is it possible to damage the locking mechanism since it is completely enclosed and sealed within the shell. Although the mechanism has been shown as applied to a valve, it is pointed out that it may be used with other control devices and in other places besides pipe lines or the like. In some instances, the actuating bar 31 and rod 30 may be eliminated in which case, the stem 32 of the valve would have the usual hand wheel thereon. In such case, the entire locking mechanism would be lifted from within the sleeve 14 when the plungers 21 and 22 are disengaged from their respective notches. After removal of the locking mechanism, the valve is manually operated.

What I claim and desire to secure by Letters Patent is:

1. A locking mechanism for a control device including, a casing, rotatable means within the casing arranged to operate said device, an actuating member rotatably confined within the casing above said means, means for connecting said member to said means for imparting rotation thereto to operate the control device, and means for locking the rotatable means to the casing to prevent actuation thereof.

2. A locking and operating mechanism for a control device including, a casing adapted to enclose said device, rotatable means within the casing having connection with said device for operating the same, an actuating member rotatably confined within the casing and mounted to undergo a limited vertical movement therein, and means actuated by the rotation and vertical movement of said member for connecting the member with said rotatable means, whereby rotation of the member will impart rotation to said means to operate the control device.

3. A locking and operating mechanism for a control device including, a casing adapted to enclose said device, rotatable means within the casing having connection with said device for operating the same, an actuating member rotatably confined within the casing and mounted to undergo a limited vertical movement therein, means actuated by the rotation and vertical movement of said member for connecting the member with said rotatable means, whereby rotation of the member will impart rotation to said means to operate the control device, and means for locking the rotatable means to the casing to prevent rotation thereof.

4. A locking and operating mechanism for a control device including, a casing adapted to enclose said device, rotatable means within the casing having connection with said device for operating the same, an actuating member rotatably confined within the casing and mounted to undergo a limited vertical movement therein, means actuated by the rotation and vertical movement of said member for connecting the member with said rotatable means, whereby rotation of the member will impart rotation to said means to operate the control device, and means connected with and actuated by the vertical movement of the actuating member for locking the rotatable means against rotation to prevent operation of the control device.

5. A locking and operating mechanism for a control device including, a casing adapted to enclose said device, rotatable means within the casing having connection with said device for operating the same, an actuating member rotatably confined within the casing and mounted to undergo a limited vertical movement therein, a plurality of movable elements within the casing connected with the actuating member and controlled thereby for establishing connection between the member and the rotatable means, said elements being arranged to connect the member and means when moved upwardly, and means for preventing upward movement of said elements until the elements are moved to a predetermined position with relation to said means by the manipulation of the actuating member, whereby the member must be properly manipulated before said elements can be utilized to connect the member with the rotatable means.

6. A locking and operating mechanism for a control device including, a casing adapted to enclose said device, rotatable means within the casing having connection with said device for operating the same, an actuating member rotatably confined within the casing and mounted to undergo a limited vertical movement therein, a plurality of movable elements within the casing connected with the actuating member and controlled thereby for establishing connection between the member and the rotatable means, said elements being arranged to connect the member and means when moved upwardly, means for preventing upward movement of said elements until the elements are moved to a predetemined position with relation to said means by the manipulation of the actuating member, whereby the member must be properly manipulated before said elements can be utilized to connect the member with the rotatable means, and means actuated by the vertical movement of the actuating member for locking the rotatable means against rotation to prevent operation of the control device.

7. A locking and operating mechanism for a control device including, a casing adapted to enclose said device, rotatable means within the casing having connection with said device for operating the same, an actuating member rotatably confined within the casing and mounted to undergo a limited vertical movement therein, a plurality of movable elements within the casing connected with the actuating member and controlled thereby for establishing connection between the member and the rotatable means, said elements being arranged to connect the member and means when moved upwardly, means for preventing upward movement of said elements until the elements are moved to a predetermined position with relation to said means by the manipulation of the actuating member, whereby the member must be properly manipulated before said elements can be utilized to connect the member with the rotatable means, and a retractible locking plunger actuated by the vertical movement of the actuating member for locking the rotatable means against rotation when the connecting elements are in a disconnected position and for unlocking the rotatable means when the elements are establishing connection between the member and rotatable means.

8. A locking and operating mechanism for a control device including, a casing, a rotatable means within the casing having connection with said device for operating the same, an actuating member within the casing rotatably confined above said means and capable of a limited vertical movement, and connecting means actuated by the rotation and vertical movement of the member and including a plurality of rotatable and vertically movable elements having peripheral lugs coacting with stationary members having recesses, whereby said elements must have their lugs alined with the recesses of the stationary members through rotation of the actuating member before the actuating member and elements can be lifted to establish connection between said member and the rotatable means.

9. A locking and operating mechanism for a control device including, a casing, a rotatable means within the casing having connection with said device for operating the same, an actuating member within the casing rotatably confined above said means and capable of a limited vertical movement, connecting means actuated by the rotation and vertical movement of the member and including a plurality of rotatable and vertically movable elements having peripheral lugs coacting with stationary members having recesses, whereby said elements must have their lugs alined with the recesses of the stationary members through rotation of the actuating member before the actuating member and elements can be lifted to establish connection between said member and the rotatable means, and means actuated by the vertical movement of the actuating member for locking the rotatable means against rotation.

10. A locking and operating mechanism for a control device including, a casing, a rotatable means within the casing having connection with said device for operating the same, an actuating member within the casing rotatably confined above said means and capable of a limited vertical movement, connecting means actuated by the rotation and vertical movement of the member and including a plurality of rotatable and vertically movable elements having peripheral lugs coacting with stationary members having recesses, whereby said elements must have their lugs alined with the recesses of the stationary members through rotation of the actuating member before the actuating member and elements can be lifted to establish connection between said member and the rotatable means, and a retractible locking plunger actuated by the vertical movement of the actuating member for locking the rotatable means against rotation when the connecting elements are in a disconnected position and for unlocking the rotatable means when the elements are establishing connection between the member and rotatable means.

11. A locking and operating mechanism for a control device including, a casing, a rotatable means within the casing having connection with said device for operating the same, an actuating member within the casing rotatably confined above said means and capable of a limited vertical movement, connecting means actuated by the rotation and vertical movement of the member and including a plurality of rotatable and vertically movable elements having peripheral lugs coacting with stationary members having recesses, whereby said elements must have their lugs alined with the recesses of the stationary members through rotation of the actuating member before the actuating member and elements can be lifted to establish connection between said member and the rotatable means, the casing having notches therein adjacent the rotatable means, and locking plungers carried by said means and adapted to engage in said notches to lock said means to the casing and prevent rotation thereof.

12. A locking and operating mechanism for a control device including, a casing, a rotatable means within the casing having connection with said device for operating the same, an actuating member within the casing rotatably confined above said means and capable of a limited vertical movement, connecting means actuated by the rotation and vertical movement of the member and including a plurality of rotatable and vertically movable elements having peripheral lugs coacting with stationary members having recesses, whereby said elements must have their lugs alined with the recesses of the stationary members through rotation of the actuating member before the actuating member and elements can be lifted to establish connection between said member and the rotatable means, the casing having notches therein adjacent the rotatable means, locking plungers carried by said means and adapted to engage in said notches to lock said means to the casing and prevent rotation thereof, and means for connecting the plungers to the actuating member, whereby when the member is in a lowered position, the plungers are engaged within the notches and when the member is in a raised position the plungers are retracted from the notches.

13. A locking mechanism for a control device, including a casing having its lower end enclosing said control device, rotatable means normally locked within the upper end of the casing to prevent access to the device, and an actuating member rotatably confined within the casing above said means and connected thereto, whereby manipulation of said member unlocks said rotatable means to permit access to the control device.

EDWARD T. MILLER.